United States Patent
Tsutsumi et al.

(10) Patent No.: US 9,297,308 B2
(45) Date of Patent: Mar. 29, 2016

(54) TEMPERATURE MEASUREMENT IN A GAS TURBINE

(71) Applicant: MITSUBISHI HEAVY INDUSTRIES, LTD., Tokyo (JP)

(72) Inventors: Eiichi Tsutsumi, Tokyo (JP); Kenichi Arase, Tokyo (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 542 days.

(21) Appl. No.: 13/774,676

(22) Filed: Feb. 22, 2013

(65) Prior Publication Data
US 2013/0272860 A1    Oct. 17, 2013

(30) Foreign Application Priority Data
Feb. 27, 2012   (JP) ................................. 2012-039578

(51) Int. Cl.
| F01D 9/04 | (2006.01) |
| F01D 11/00 | (2006.01) |
| F01D 11/02 | (2006.01) |
| F01D 21/00 | (2006.01) |
| F02C 7/00 | (2006.01) |

(Continued)

(52) U.S. Cl.
CPC . *F02C 7/00* (2013.01); *F01D 11/02* (2013.01); *F01D 11/06* (2013.01); *F02C 7/28* (2013.01); *F05D 2240/57* (2013.01); *F05D 2270/303* (2013.01)

(58) Field of Classification Search
CPC ..... F01D 21/003; F01D 11/001; F01D 11/02; F01D 9/041

USPC ..................... 415/118, 173.1, 211.2
See application file for complete search history.

(56) References Cited

U.S. PATENT DOCUMENTS

| 4,730,979 A * | 3/1988 | Hook, Jr. ............... F01D 11/001 |
| | | 415/118 |
| 6,546,735 B1 * | 4/2003 | Moniz ................... F01D 21/003 |
| | | 415/118 |

(Continued)

FOREIGN PATENT DOCUMENTS

| JP | 58-113824 A | 7/1983 |
| JP | 4-292530 A | 10/1992 |

(Continued)

OTHER PUBLICATIONS

Office Action dated Sep. 1, 2015, issued in counterpart Japanese Patent Application No. 2012-039578, with English translation (6 pages).

*Primary Examiner* — Mary A Davis
(74) *Attorney, Agent, or Firm* — Westerman, Hattori, Daniels & Adrian, LLP

(57) ABSTRACT

A gas turbine according to the invention includes a seal housing in which a leaf-shaped seal is provided and a detection end space, a gas introduction path, and a gas discharge path are also formed. The detection end space is formed at a position on the outside in a radial direction from a leaf-shaped seal, and the gas introduction path has an introduction port formed at a position further on the downstream side than the leaf-shaped seal and also has a radially extending portion extending toward the outside in the radial direction from the introduction port and an axially extending portion extending in the direction of an axis from an end portion of the radially extending portion and reaching the detection end space.

5 Claims, 5 Drawing Sheets

(51) Int. Cl.
*F01D 11/06* (2006.01)
*F02C 7/28* (2006.01)

(56) References Cited

U.S. PATENT DOCUMENTS

| | | | |
|---|---|---|---|
| 6,832,891 B2 * | 12/2004 | Aschenbruck | F01D 11/001 415/173.7 |
| 8,371,804 B2 * | 2/2013 | Bilson | F01D 21/045 415/118 |
| 8,400,501 B2 * | 3/2013 | Heyworth | F01D 21/003 350/539.26 |
| 2001/0051095 A1 * | 12/2001 | Schotsch | F01D 21/003 415/118 |

FOREIGN PATENT DOCUMENTS

| | | |
|---|---|---|
| JP | 2002-322918 A | 11/2002 |
| JP | 2004-28036 A | 1/2004 |
| JP | 2010-196664 A | 9/2010 |

* cited by examiner

TEMPERATURE MEASUREMENT IN A GAS TURBINE

TECHNICAL FIELD

The present invention relates to a gas turbine and in particular to a structure for measuring the temperature between a rotor disk of a rotor and an inner portion of a turbine vane in a radial direction of the rotor.

Priority is claimed on Japanese Patent Application No. 2012-039578 filed on Feb. 27, 2012, the contents of which are incorporated herein by reference.

BACKGROUND ART

As a gas turbine, there are gas turbines described in, for example. Patent Documents 1 and 2 below.

A rotor of the gas turbine described in Patent Document 1 has a rotor disk of each of a plurality of stages, and a plurality of blades fixed to the rotor disk. Further, a plurality of vanes of the gas turbine is disposed on the upstream sides of the blades of each of the plurality of stages. An upstream-side rim portion which protrudes to the upstream side and first and second downstream-side rim portions which protrude to the downstream side are formed at the rotor disk of each of the plurality of stages. The second downstream-side rim portion of the rotor disk is located further radially inward than the first downstream-side rim portion and faces the upstream-side rim portion of a downstream-side rotor disk adjacent to the downstream side of the rotor disk.

A seal housing which faces the second downstream-side rim portion of the rotor disk on the upstream side with respect to the vane and the upstream-side rim portion of the rotor disk on the downstream side with respect to the vane is fixed to the inside of the vane in the radial direction. A first upstream-side seal member which performs sealing between the seal housing and the first downstream-side rim portion of the upstream-side rotor disk, a second upstream-side seal member which performs sealing between the seal housing and the second downstream-side rim portion of the upstream-side rotor disk., and a downstream-side seal member which performs sealing between the seal housing and the upstream-side rim portion of the downstream-side rotor disk are provided at the seal housing.

In the gas turbine, a thermometer for measuring the temperature of gas in a disk cavity between the seal housing and the rotor disk on the upstream side and the rotor disk on the downstream side with respect to the seal housing is provided.

In the seal housing, a detection space in which a temperature detection end of the thermometer is inserted, a gas introduction path extending from the detection point space to the upstream side along an axis of rotation, and a gas discharge path extending from the detection end space to the downstream side along the axis of rotation are formed. An introduction port of the gas introduction path is located further to the upstream side than the first upstream-side seal member provided at the seal housing and on the outside in the radial direction. Further, a discharge port of the gas discharge path is located further to the downstream side than the downstream-side seal member provided at the seal housing and on the outside in the radial direction.

The thermometer detects the temperature of gas which flows in from the introduction port of the gas introduction path, that is, gas in an area of the disk cavity further on the upstream side and further on the outside in the radial direction than the first upstream-side seal member.

Further, in Patent Document 2, there is disclosed a thermometer in which a body portion of the thermometer is bent such that a detection end provided at the tip of the body portion can detect the temperature of gas in a target area in the disk cavity.

PRIOR ART DOCUMENTS

Patent Document

[Patent Document 1] Japanese Unexamined Patent Application. First Publication No. 2010-196664
[Patent Document 2] Japanese Unexamined Patent Application, First Publication No. 2002-322918

SUMMARY OF THE INVENTION

Problem that the Invention Is to Solve

In order to manage the durability or the like of the rotor disk, it is necessary to detect the temperature of gas in the disk cavity, as in the technique described in Patent Document 1 above. However, as shown in Patent Document 1, in an area of the disk cavity further on the upstream side and further on the outside in the radial direction than the first upstream-side seal member, there is a possibility that the temperature in a circumferential direction may he non-uniform by a local backflow, rather than an essential back/flow of combustion gas, due to the influence of blades arranged in a combustion gas flow path, and thus precise detection of the temperature of the rotor disk is difficult. For this reason, in the technique described in Patent Document 1, there is a problem in that temperature management of the rotor disk is difficult.

The present invention has an object to provide a gas turbine in which a problem of temperature detection failure is small and temperature management of a rotor disk can be easily performed.

Means for Solving the Problem

A gas turbine according to an embodiment of the invention for achieving the above object includes:

a rotor that rotates around an axis of rotation; a casing that covers the rotor so as to be rotatable; and a vane fixed to the casing, wherein the rotor has a rotor disk centered on the axis of rotation and a plurality of blades fixed to the rotor disk and arranged in a circumferential direction with respect to the axis of rotation, in each of a plurality of stages arranged in an axial direction in which the axis of rotation extends, and a plurality of the vanes are disposed side by side in the circumferential direction on the upstream side of the blades in each of the plurality of stages, an upstream-side rim portion protruding to the upstream side and a downstream-side rim portion protruding to the downstream side are formed on the rotor disk of each of the plurality of stages, an annular seal housing is fixed to the inside of the vane in a radial direction of the rotor, an upstream-side seal member facing the downstream-side rim portion on the upstream side with respect to the seal housing is provided in the seal housing, and a detection end space in which a temperature detection end of a thermometer is accommodated, a gas introduction path which leads gas in a disk cavity between the seal housing and the upstream-side rim portion on the downstream side with respect to the seal housing and the downstream-side rim portion to the detection end space, and a gas discharge path that discharges gas, which has reached the detection end space, further to the downstream side than an introduction port of the gas introduction path are also formed in the seal housing, the detection end space is formed at a radially outer position with respect to the upstream-side seal member, and the introduction port of the gas introduction path is formed at a position further on the downstream side than the upstream-side seal member, and the gas introduction path has a radially extending portion which extends toward the outside in the radial direction from the introduction port, and an axially extending portion which extends from an outer end portion of the radially extending portion to the upstream side along the axis of rotation and reaches the detection end space.

The disk cavity between the seal housing and the upstream-side or downstream-side rim portions is little affected by combustion gas which flows back from a combustion gas flow path of the gas turbine. For this reason, even if the ratio between the combustion gas and cooling gas changes and thus the flows of the combustion gas and the cooling gas change, by detecting the temperature of gas in the disk cavity, it is possible to reliably detect the temperature of gas according to the ratio.

Accordingly, in the gas turbine, since the temperature of gas in the disk cavity between the seal housing and the upstream-side or downstream-side rim portions is detected, temperature management of the rotor disk can. be easily performed.

In the gas turbine, a downstream-side seal member facing the upstream-side rim portion on the downstream side with respect to the seal housing may be provided in the seal housing, and the introduction port of the gas introduction path may be formed at a position further on the upstream side than the downstream-side seal member.

An area between the upstream-side seal member and the downstream-side seal member is an area in which the temperature non-uniformity in the circumferential direction is relatively small. For this reason, it is possible to reliably detect the temperature of gas in the disk cavity.

In addition, in the gas turbine, since a difference in pressure between the introduction port of the gas introduction path and a discharge port of the gas discharge path becomes large, the flow rate of gas flowing in the detection end space increases, and thus it is possible to increase the responsiveness of temperature detection to a change in the temperature of gas.

In the gas turbine, the upstream-side seal member may be a brush seal or a leaf-shaped seal.

In the gas turbine, sealing performance between the rotor and the vane can be increased.

In the gas turbine, the gas discharge path may extend from the detection end space to the downstream side along the axis of rotation.

in the gas turbine, since each gas flow path which is formed in the seal housing is linearly made, hole drilling on the seal housing for forming each gas flow path can be easily performed.

In the gas turbine, a gas path forming hole which extends from the detection end space to the downstream side along the axis of rotation and in which a portion of an internal space forms the axially extending portion of the gas introduction path and the gas discharge path may he formed in the seal housing, and a partition member partitioning the internal space into the axially extending portion of the gas introduction path and the gas discharge path may be inserted and mounted in the gas path forming hole.

In the gas turbine, hole drilling on the seal housing can be more easily performed.

Effects of the Invention

According to the invention, a problem of temperature detection failure is reduced and the temperature management of the rotor disk can be easily performed.

BEST MODE FOR CARRYING OUT THE INVENTION

Hereinafter, an embodiment of a gas turbine according to the invention will be described in detail referring to FIGS. 1 to 5.

Figure 1:
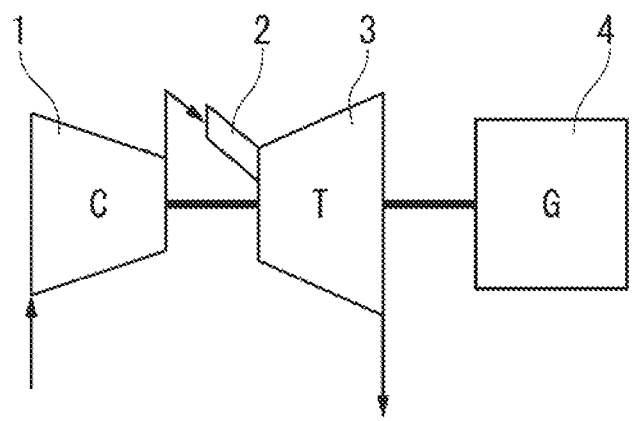
FIG. 1 is a schematic diagram showing the configuration of a gas turbine in an embodiment related to the invention.

A gas turbine of this embodiment includes a compressor 1 which compresses external air to generate compressed air, a plurality of combustors 2 which mixes fuel from a fuel supply source with the compressed air and bums the mixture, thereby generating combustion gas, and a turbine 3 which is driven by the combustion gas, as shown in FIG 1.

Figure 2:
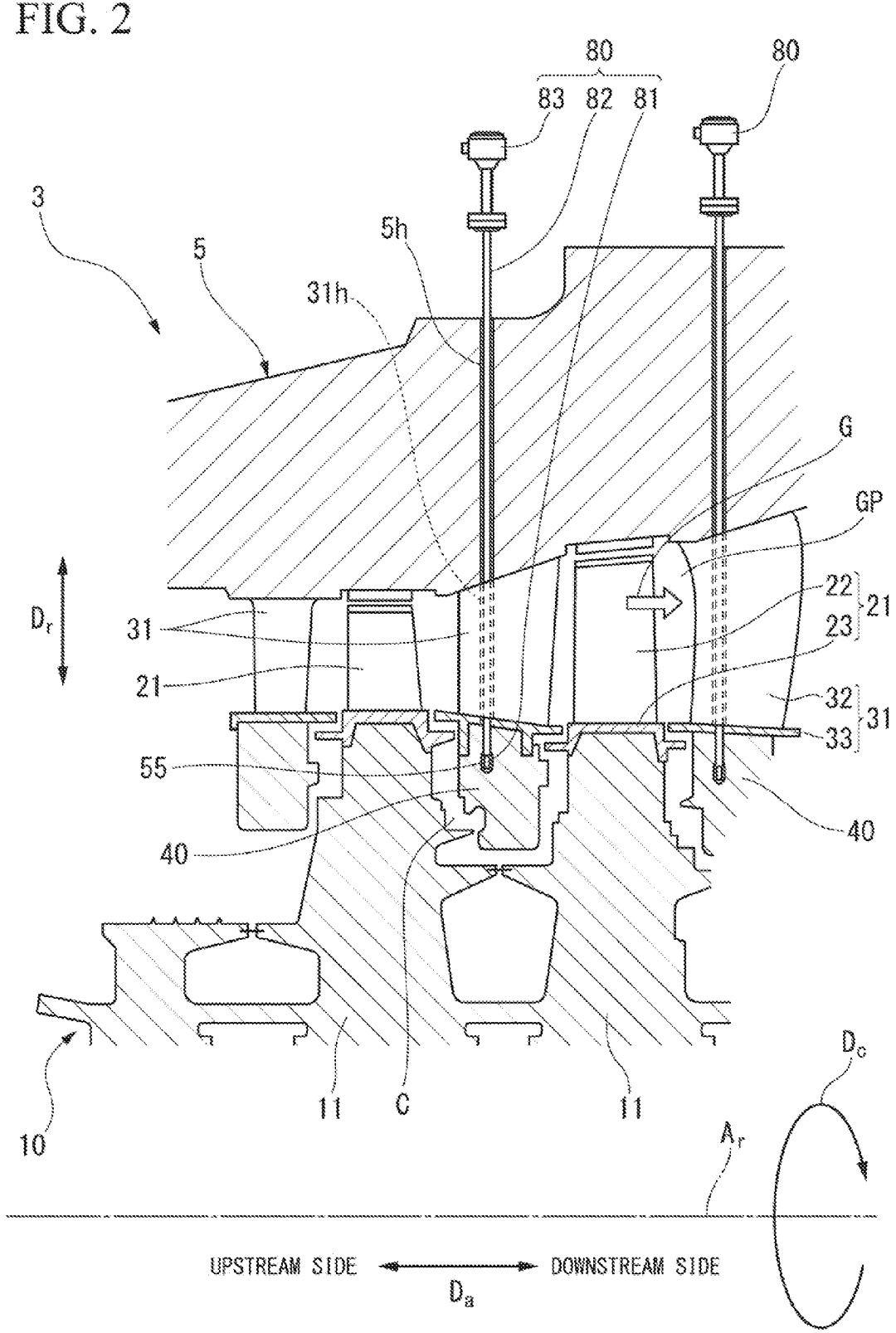
FIG 2 is a cross-sectional view of a main section of the gas turbine in the embodiment related to the invention.

The turbine 3 includes a easing 5, and a rotor 10 which rotates in the casing 5, as shown in FIG 2. For example, an electric generator 4 (FIG. 1) which generates electricity by rotation of the rotor 10 is connected to the rotor 10. In addition, in the following, a direction in which an axis of rotation Ar that is the center of rotation of the rotor 10 extends is referred to as an axial direction Da. Further, in a radial direction Dr with respect to the axis of rotation Ar, a side coming close to the axis of rotation Ar is referred to as the radially inner side and a side getting away from the axis of rotation Ar is referred to as the radially outer side.

The rotor 10 has a rotor disk 11 centered on the axis of rotation Ar, and a plurality of blades 21 fixed to the rotor disk 11 and arranged in a circumferential direction Dc with respect to the axis of rotation Ar, for each of a plurality of stages arranged in the axial. direction Da. A plurality of vanes 31 is fixed to the inner periphery of the casing 5 at the upstream sides of the blades 21 in each of the plurality of stages. The plurality of vanes 31 of each stage is disposed side by side in the circumferential direction Dc with respect to the axis of rotation Ar.

In the plurality of vanes 31 of each stage, a seal housing 40 is fixed to the radially inner side. In the turbine 3, a thermometer 80 for measuring the temperature of gas in a disk cavity C between the seal housing 40 and the rotor disk 11 on the upstream side and the rotor disk 11 on the downstream side with respect to the seal housing 40 is provided.

The thermometer 80 has a detection end 81, a straight body portion 82 linearly extending from the detection end 81, and a terminal box 83 provided at an end portion of the straight body portion 82. The thermometer 80 in this embodiment is a thermocouple thermometer and end portions of two metal wires formed of different materials forming a thermocouple are accommodated in the terminal box 83. In addition, in this embodiment, as the thermometer 80, a thermocouple thermometer is used. However, other types of thermometers, such as a resistance thermometer, for example, may be used.

Thermometer passing-through holes 5h and 31h in which the detection end 81 and the straight body portion 82 of the thermometer 80 are inserted are formed in the casing 5 and the vane 31. Further, a detection end space 55 which communicates with the thermometer passing-through hole 31h of the vane 31 and in which the detection end 81 of the thermometer 80 is accommodated is formed in the seal housing 40.

Figure 3:
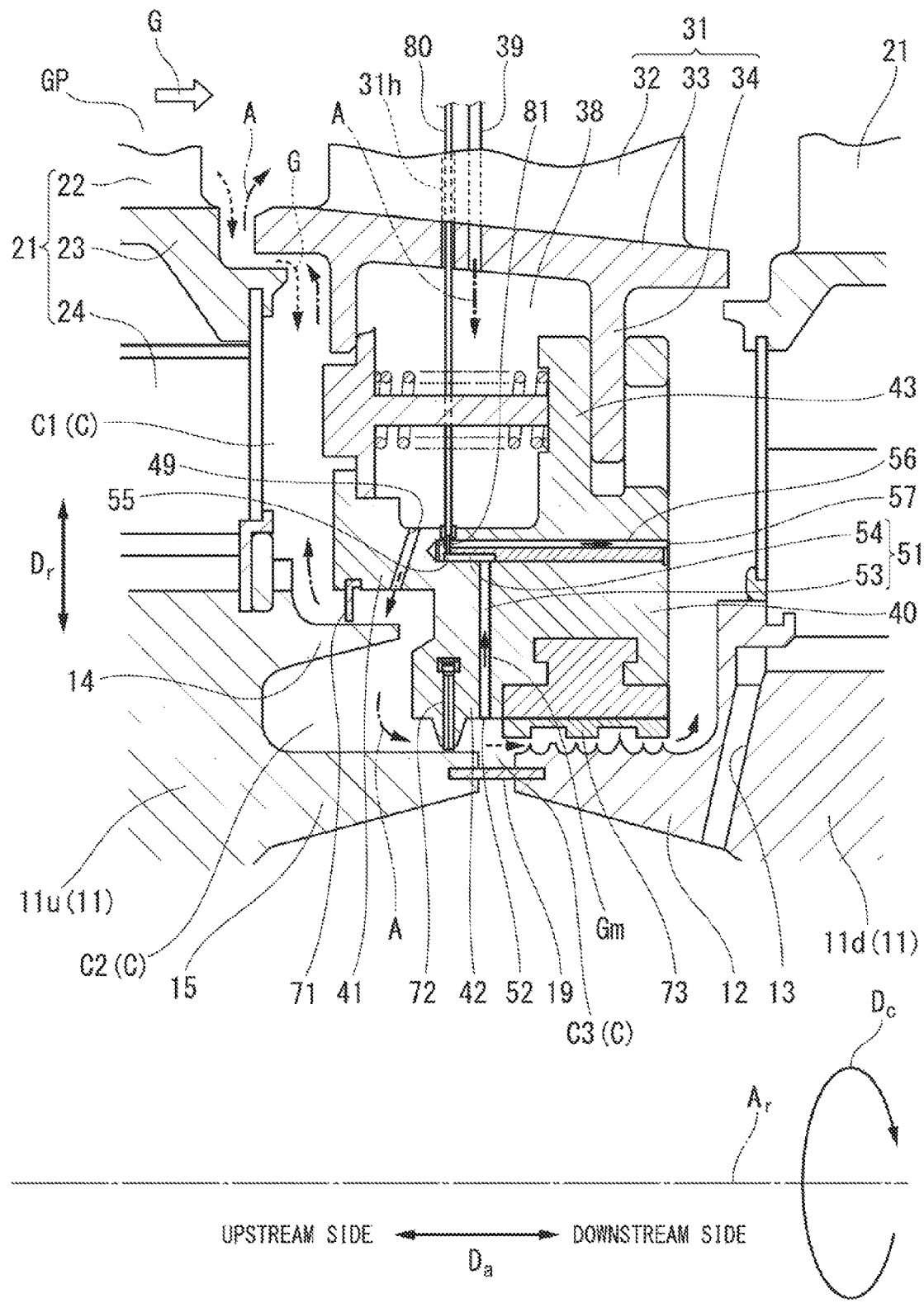
FIG. 3 is a detailed cross-sectional view of the circumferences of a rotor disk and a seal housing in FIG. 2.

As shown in FIG. 3, an upstream-side rim portion 12 which protrudes to the upstream side and a first downstream-side rim portion 14 and a second downstream-side rim portion 15 which protrude to the downstream side are formed at the rotor disk 11 of each of the plurality of stages. The second downstream-side rim portion 15 of the rotor disk 11 is located further to the radially inner side than the first downstream-side rim portion 14. The second downstream-side rim portion 15 faces the upstream-side rim portion 12 of a downstream-side rotor disk 11d adjacent to the downstream side of the rotor disk 11 and an air baffle 19 is provided between the two.

The blade 21 which is fixed to the rotor disk 1.1 has a blade main body 22 extending in the radial direction Dr, a platform 23 provided on the radially inner side of the blade main body 22. a shank 24 provided on the radially inner side of the platform 23, and a blade root (not shown) provided on the radially inner side of the shank 24, The blade root of the blade 21 is inserted into the rotor disk 11 whereby the blade 21 is fixed to the rotor disk 11.

The vane 31 fixed to the casing 5 has a vane main body 32 extending to the radially inner side from the inner peripheral surface of the easing 5, an inner shroud 33 provided on the radially inner side of the vane main body 32, and a leg portion 34 extending to the radially inner side from the inner shroud 33.

A seal tube 39, which supplies some of cooling gas A that is the compressed air extracted from the hallway of the compressor 1 (FIG 1) to the inner shroud 33 for cooling of the vane 31, is disposed in the vane main body 32 so as to pass through the vane main body 32 in the radial direction Dr. and is opened to an inner shroud cavity 38 at a terminus thereof.

A space surrounded by the radially outer surface of the inner shroud 33 of the vane 31, the radially outer surface of the platform 23 of the blade 21, and the inner peripheral surface of the casing 5 forms a combustion gas flow path GP through which combustion gas G from the combustor 2 flows, as shown in FIG. 2.

An outer facing portion 41, which faces the first downstream-side rim portion 14 of an upstream-side rotor disk 11u with respect to the seal housing 40 in the radial direction Dr, is formed on the radially inner side of the seal housing 40, as shown in FIG. 3. In addition, an inner facing portion 42 which faces each of the second downstream-side rim portion 15 of the upstream-side rotor disk 11u and the upstream-side rim portion 12 of the downstream-side rotor disk 11d in the radial direction Dr is formed on the radially inner side of the seal housing 40. The outer facing portion 41 is formed at a position on the upstream side and at a radially outer position with respect to the inner facing portion 42.

A fin seal 71 performing sealing between the outer facing portion 41 of the seal housing 40 and the first downstream-side rim portion 14 of the upstream-side rotor disk 11u which faces the outer facing portion 41 in the radial direction Dr is provided at the outer facing portion 41.

On the other hand, at an upstream-side portion of the inner facing portion 42 of the seal housing 40, a leaf-shaped seal fan upstream-side seal member) 72 performing sealing between the inner facing portion 42 and the second downstream-side rim portion 15 of the upstream-side rotor disk 11u which faces the inner facing portion 42 in the radial direction Dr is provided. In addition, at a downstream-side portion of the inner facing portion 42 of the seal housing 40, a labyrinth seal (a downstream-side seal member) 73 performing sealing between the inner facing portion 42 and the upstream-side rim portion 12 of the downstream-side rotor disk 11d which, feces the inner facing portion 42 in the radial direction Dr is provided. The above-described detection end space 55 formed in the seal housing 40 is formed at a radially outer position with respect to the leaf-shaped seal 72.

Here, in the disk cavity C, an area facing the shank 24 of the blade 21 on the upstream side is set to be a first cavity C1. In other words, the first cavity C1 is an area further on the upstream side and further radially outer side than the fin seal 71 provided at the seal housing 40. Further, in the disk cavity C, an area further on the downstream side than the fin seal 71 and further on the upstream side than the leaf-shaped seal 72 is set to be a second cavity C2. In the disk cavity C, an area further on the downstream side than the leaf-shaped seal 72 and. further on. the upstream side than the labyrinth seal 73 is set to be a third cavity C3.

In addition, the leaf-shaped seal 72 is provided with a large number of lamina seal pieces and a retention portion which retains end portions of the large number of lamina seal pieces. The large number of lamina seal pieces are arranged around a rotating body (in this case, the second downstream-side rim portion 15 of the rotor disk 11) with a thickness direction of each lamina seal piece directed in the circumferential direction Dc of the rotating body and with a minute gap held with respect to one another in the circumferential direction Dc. A radially inner end portion of each lamina, seal piece is a free end and a radially outer end portion is retained by the retention portion. Each lamina seal piece is disposed to be inclined such that the radially inner free end is located further to the rotation direction side of the rotating body than the radially outer fixed end portion.

In the leaf-shaped seal 72, the free end of each lamina seal piece is in contact with the rotating body when the rotating body remains stationary. However, when the rotating body rotates, the free end of each lamina seal piece rises from the outer peripheral surface of the rotating body due to a dynamic pressure effect which is generated by the rotation of the rotating body, thereby entering a non-contact state with the rotating body. For this reason, the leaf-shaped seal 72 has extremely high sealing performance and also has high durability.

The fin seal 71 and the leaf-shaped seal 72 described above are provided in order to prevent the combustion gas G, which flows back from the combustion gas flow path GP to the disk cavity C on the upstream side, from entering the rotor side disk cavity C which is on the radially inner side. In particular, since the leaf-shaped seal 72 having high sealability is disposed on the farthest upstream side of the inner facing portion 42, whereby a variation in the space temperature of the third cavity C3 surrounded by the leaf-shaped seal 72 and the labyrinth seal 73 are suppressed, the leaf-shaped seal 72 is important.

A connection portion 43 which is connected to the leg portion 34 of the inner shroud 33 is provided at the radially outer side of the seal housing 40.

Figure 4:
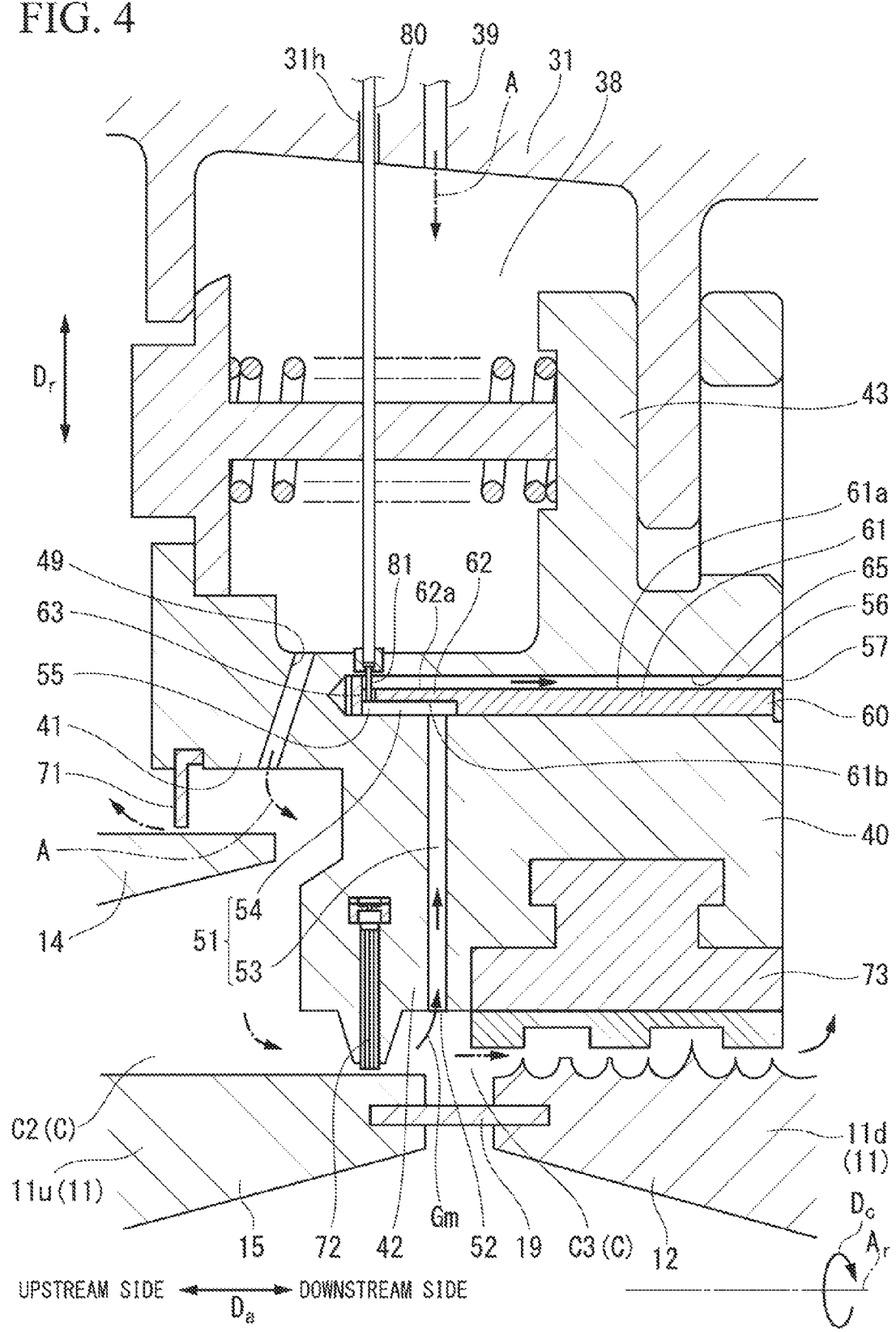
FIG. 4 is a detailed cross-sectional view of the circumference of the seal housing in
FIG 3.

In addition, a gas introduction path 51 which leads gas Gm in the third cavity C3 which is formed between the leaf-shaped seal 72 and the labyrinth seal 73 to the detection end space 55 and a gas discharge path 56 which discharges the gas that has reached the detection end space 55 are formed in the seal housing 40, as shown in FIG. 4. In addition, a purge hole 49 of which one side is opened to the inner shroud cavity 38 and the other side is opened to the second cavity C2 is formed in the outer facing portion 41 of the seal housing 40.

An introduction port 52 of the gas introduction path 51 is formed at the inner facing portion 42 of the seal housing 40 and between the leaf-shaped seal 72 and the labyrinth seal 73. The gas introduction path 51 has a radially extending portion 53 extending toward the radially outer side from the introduction port 52, and an axially extending portion 54 extending from an outer end portion of the radially extending portion 53 to the upstream side along the axis of rotation Ar and reaching the radially inner position of the detection end space 55. The gas discharge path 56 extends from the radially outer position of the detection end space 55 to the downstream side along the axis of rotation Ar. For this reason, a discharge port 57 of the gas discharge path 56 is located further to the radially outer side than the labyrinth seal 73. In addition, the detection end space 55 extends toward the radially outer side from an upstream-side end of the axially extending portion 54 of the gas introduction path 51 and is connected to the gas discharge path 56 at a radial outer end thereof.

Incidentally, the thermometer 80 which is inserted to the seal housing 40 toward the radially inner side from the outside of the casing 5 (shown in FIG. 2) is inserted by passing through the vane main body 32. For this reason, the thermometer 80 cannot, help but be disposed further to the upstream side than an intermediate portion of the seal housing 40 in the axial direction Da in the seal housing 40 and it is difficult to dispose the thermometer 80 on the downstream side. On the other hand, as described above, it is preferable that the leaf-shaped seal 72 be disposed on the farthest upstream side of the inner facing portion 42 of the seal housing 40 and the introduction port 52 be disposed at a position facing the third cavity C3 in which a variation in space temperature is suppressed, that is, on the downstream side of the leaf-shaped seal 72. For this reason, it is difficult to dispose the radially extending portion 53 of the gas introduction path 51 at the same position as the thermometer 80 or further to the upstream side than the thermometer 80 when viewed in a horizontal direction on the planes of paper of FIGS. 3 and 4, and the axially extending portion 54 extending from the outer end portion of the radially extending portion 53 to the upstream, side along the axis of rotation Ar cannot help but be provided.

Figure 5:
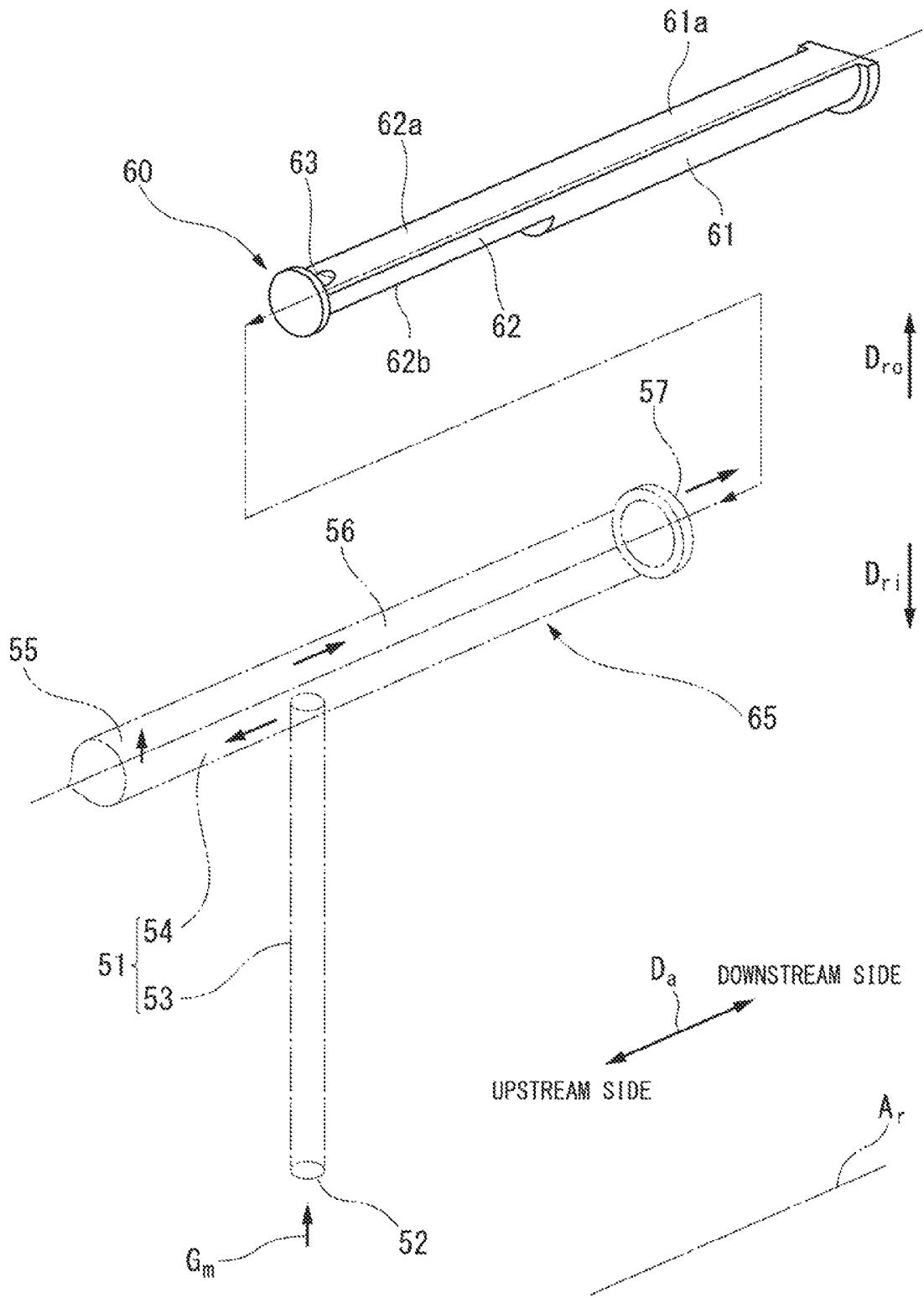
FIG. 5 is a perspective view of a gas path forming hole and a partition member in the embodiment related to the invention.

Here, a columnar gas path forming hole 65 extending from a downstream end portion of the outer facing portion 41 to the downstream side along the axis of rotation Ar is formed in the seal housing 40, as shown in FIGS. 4 and 5.

Then, a partition member 60 is inserted and mounted in an internal space of the gas path forming hole 65, whereby the gas discharge path 56, the detection end space 55, and the axially extending portion 54 of the gas introduction path 51 are formed respectively.

The partition member 60 has a semi-columnar portion 61 which fills a radially inner space while securing a radially outer space in a space on the downstream side of the internal space of the gas path, forming hole 65 extending in a direction along the axis of rotation Ar, and a partition plate portion 62 which partitions a space on the upstream side of the internal space of the gas path forming hole 65 into a radially outer space and a radially inner space, as shown in FIG. 5. A planar surface 61a facing the inner peripheral surface on the radially outer side of the gas path forming hole 65 in which the partition member 60 is inserted is flush with a radially outer surface 62a of the partition plate portion 62. A through-hole 63 passing through the partition plate portion 62 in the radial direction Dr is formed in an upstream-side end portion of the partition plate portion 62.

The partition member 60 described above is mounted in the gas path forming hole 65, whereby the axially extending portion 54 of the gas introduction path 51 and the gas discharge path 56 are formed in the internal space of the gas path forming hole 65. That is, in the internal space of the gas path forming hole 65, an area surrounded by the inner peripheral surface on the radially inner side of the gas path forming hole 65 and a surface 62b on the radially inner side of the partition plate portion 62 of the partition member 60 forms the axially extending portion 54 of the gas introduction path 51. Further, in the internal space of the gas path forming hole 65, an area surrounded by the inner peripheral surface on the radially outer side of the gas path forming hole 65, the surface 62a on the radially outer side of the partition plate portion 62 of the partition member 60, and the planar surface 61a of the semi-columnar portion 61 forms the gas discharge path 56. Further, the upstream-side end portion of the partition plate portion 62 reaches the detection end space 55. The through-hole 63 formed in the upstream-side end portion of the partition plate portion 62 is a hole in which the detection end 81 of the thermometer 80 is inserted, and is also a hole for sending gas that has reached the detection end space 55 from the axially extending portion 54 of the gas introduction path 51 to the gas discharge path 56 side.

Next, the flow of gas and the temperature detection by the thermometer 80 in the gas turbine described above will be described.

The high-temperature and high-pressure combustion gas G from the combustor 2 passes through the combustion gas flow path GP described above and comes into contact with the blade 21 in the process, thereby rotating the rotor 10 having the blade 21 around the axis of rotation Ar.

Further, the cooling gas A (a dashed-dotted line in FIGS. 3 and 4) supplied from the outside of the casing 5 to the seal tube 39 provided in the vane 31 passes through the inner shroud cavity 38 and is then purged little by little through the purge hole 49 to the second cavity C2. Some of the cooling gas A purged leaks from the fin seal 71 to the first cavity C1 on the upstream side and is discharged to the combustion gas flow path GP through the disk cavity C1. Further, the cooling gas A that has leaked from the leaf-shaped seal 72 to the third cavity C3 on the downstream side leaks from the labyrinth seal 73 further on the downstream side, thereby being discharged to the disk cavity on the downstream side and then discharged to the combustion gas flow path GP. Therefore, during normal operation, the pressure of the disk cavity C is always maintained higher than the pressure in the combustion gas flow path GP, and thus a backflow of the combustion gas G to the disk cavity C is prevented.

However, for example, in a case where a breakdown or the like occurs in a flow rate regulation device which regulates the flow rate of the cooling gas A, or a case where abnormal leak occurs in a passage through which the cooling gas A is supplied, there is a case where the flow rate of the cooling gas A which is blown out from the inner shroud cavity 38 to the disk cavity C varies and the pressure of the combustion gas in the combustion gas flow path GP and the pressure in the disk cavity C are reversed temporarily, whereby some of the combustion gas G (a dash line in FIG. 4) flows back into the first cavity C1. In this case, since the rotor disk 11 is exposed to high temperature and thus there is a risk of significantly impairing soundness, it is necessary to manage the temperature in the rotor disk cavity C.

Next, the most suitable temperature detection place in performing the temperature management of the rotor disk cavity C will be described below.

In the first cavity C1, there is a possibility that the temperature in the circumferential direction may become non-uniform due to a local backflow, rather than an essential backflow of the combustion gas G, due to the influence of blades arranged in the combustion gas flow path GP. In a case where a thermometer has detected the local backflow, even if there is no problem in soundness, since the temperature is determined to be abnormal and there is a possibility that continuation of operation may become impossible, the first cavity C1 is not suitable as a temperature detection place.

In contrast, in the second cavity C2 further on the downstream side than the fin seal 71 in the disk cavity C, the cooling gas A is always purged little by little through the purge hole 49. Therefore, in a case where the second cavity C2 is set as a temperature detection place, even if some of the combustion gas G flows back into the disk cavity C, there is the possibility of measuring the temperature of the cooled air A purged, rather than the combustion gas G flowed back, and in this case, there is a possibility that the phenomenon of the backflow of the combustion gas G cannot be detected. For this reason, it is also not preferable to manage the temperature of the rotor disk 11 by using the temperature of gas in the second cavity C2.

On the other hand, in the third cavity C3 further on the downstream side than leaf-shaped seal 72 and further on the upstream side than the labyrinth seal 73 in the disk cavity C, the cooling gas A purged through the purge hole 49 flows in the third cavity C3 through the leaf-shaped seal 72. For this reason, the temperature distribution in the circumferential direction is in a relatively averaged state and risk of false detection due to disposition of a detection place is small. Accordingly by detecting the temperature of gas in the third cavity C3, temperature management of the rotor disk 11 becomes easy.

However, even if an attempt to linearly extend the thermometer 80 toward the third cavity C3 is made in order to detect the temperature of the gas Gm in the third cavity C3, since the leaf-shaped seal 72 is provided radially inside the thermometer 80, it is not possible to linearly extend the thermometer 80. Therefore, by bending the thermometer 80, it is possible to dispose the detection end 81 of the thermometer 80 in the third cavity C3. However, if the thermometer 80 is bent, stress is concentrated on a bent portion by vibration of the vane 31 or the seal housing 40 and in addition, a portion which guides the position of the thermometer 80 and the vicinity of the bent portion of the thermometer 80 relatively intensely come into contact with each other, thereby being subjected to wear, or the like, whereby detection may become poor.

Therefore, in this embodiment, the detection end space 55 is disposed at a radially outer position with respect to the leaf-shaped seal 72 in the seal housing 40. Further, the gas introduction path 51 which leads the gas Gm in the third cavity C3 between the leaf-shaped seal 72 and the labyrinth seal 73 in the disk cavity C to the detection end space 55, and the gas discharge path 56 which discharges the gas Gm that has reached the detection end space 55 are formed in the seal housing 40. For this reason, in this embodiment, it is possible to detect the temperature of the gas Gm in the third cavity C3 without bending the thermometer 80, and thus the temperature management of the rotor disk 11 is easily performed. In addition, the gas Gm in the third cavity C3 flows from the introduction port 52 of the seal housing 40 through the gas introduction path 51 into the detection end space 55 and comes into contact with the detection end 81 of the thermometer 80 here, whereby the temperature of the gas Gm is measured. The gas Gm which has flowed in the detection end space 55 then passes through the gas discharge path 56 and is discharged from the discharge port 57 to an area further on the downstream side than the seal housing 40 in the disk cavity C.

Further, in this embodiment, the radially extending portion 53 of the gas introduction path 51 linearly extends toward the radially outer side, the axially extending portion 54 of the gas introduction path 51 linearly extends to the upstream side along the axis of rotation Ar, and the gas discharge path 56 linearly extends to the downstream side along the axis of rotation Ar. That is, all the gas flow paths in this embodiment are linear. For this reason, in forming the gas flow paths by processing the seal housing 40, it is possible to easily machine the seal housing 40.

In addition, in this embodiment, the columnar gas path forming hole 65 is formed so as to extend from the downstream end portion of the outer facing portion 41 to the downstream side along the axis of rotation Ar. Then, the partition member 60 is inserted and mounted in the internal space of the gas path forming hole 65, whereby the gas discharge path 56, the detection end space 55, and the axially extending portion 54 of the gas introduction path 51 are formed respectively. For this reason, in this embodiment, in addition, it is possible to easily perform hole drilling on the seal housing 40.

Incidentally, in a case where the temperature of gas changes suddenly due to a change or the like in an operation state of the gas turbine and thus a difference in the temperature occurs between the seal housing 40 and the gas Gm in live third cavity C3, the temperature of gas is affected by the temperature of the seal housing 40, and thus the accurate temperature of the gas Gm becomes unable to be detected temporarily. That is, if the gas Gm in the third cavity C3 is drawn into the seal housing 40, there is a concern that the responsiveness of temperature detection of the gas in the third cavity C3 may deteriorate. However, in this embodiment, since both the gas Gm heading for the detection end space 55 and the gas Gm discharged from the detection end space 55 come into contact with tire partition plate portion 62, even if the temperature of gas changes suddenly due to a change or the like in an operation state of the gas turbine, the temperature of the partition plate portion 62 becomes the same with the temperature of gas in a short period of time, and therefore, deterioration of the responsiveness of temperature detection of the gas in the third cavity C3 can be suppressed.

In addition, in the embodiment described above, as the upstream-side seal member, the leaf-shaped seal 72 is used. However, instead of this, other seals such as a brush seal are also acceptable. In addition, the brush seal is a seal in which a plurality of metal wires is bundled, an end portion on one side of a bundle of the metal wires is retained by a retention portion, and an end on the other side is a free end and faces the outer peripheral surface of the rotating body. In addition, in this embodiment, as the downstream-side seal member, the labyrinth seal 73 is used. However, instead of this, other seals may be used.

INDUSTRIAL APPLICABILITY

The invention relates to a gas turbine and in particular to a structure for measuring the temperature between a rotor disk of a rotor and a portion on the radially inner side of a vane.

According to the invention, a problem of the temperature detection failure is reduced and temperature management of the rotor disk can be easily performed.

REFERENCE SIGNS LIST

1: compressor
2: combustor
3: turbine
5: casing
10: rotor
11: rotor disk
12: upstream-side rim portion
14: first downstream-side rim portion
15: second downstream-side rim portion
21: blade
31: vane
39: seal tube
40: seal housing
49: purge hole
51: gas introduction path
52: introduction port
53: radially extending portion
54: axially extending portion
55: detection end space
56: gas discharge path
57: discharge port
60: partition member
65: gas path forming hole
72: leaf-shaped seal (upstream-side seal member)
73: labyrinth seal (downstream-side seal member)
80: thermometer
81: detection end

The invention claimed is:

1. A gas turbine comprising:
a rotor that rotates around an axis of rotation;
a casing that covers the rotor so as to be rotatable; and
a vane fixed to the casing,
wherein the rotor has a rotor disk centered on the axis of rotation and a plurality of turbine blades fixed to the rotor disk and arranged in a circumferential direction with respect to the axis of rotation, in each of a plurality of stages arranged in an axial direction in which the axis of rotation extends, and a plurality of the vanes are disposed side by side in the circumferential direction on the upstream side of the plurality of turbine blades in each of the plurality of stages,
an upstream-side rim portion protruding to the upstream side and a downstream-side rim portion protruding to the downstream side are formed on the rotor disk of each of the plurality of stages,
an annular seal housing is fixed to the inside of the vane in a radial direction of the rotor,
an upstream-side seal member facing the downstream-side rim portion on the upstream side with respect to the annular seal housing is provided in the annular seal housing, and a detection end space in which a temperature detection end of a thermometer is accommodated, a gas introduction path which leads gas in a disk cavity between the annular seal housing and the upstream-side rim portion on the downstream side with respect to the annular seal housing and the downstream-side rim portion to the detection end space, and a gas discharge path that discharges gas, which has reached the detection end space, further to the downstream side than an introduction port of the gas introduction path are also formed in the annular seal housing,
the detection end space is formed at a radially outer position with respect to the upstream-side seal member, and
the introduction port of the gas introduction path is formed at a position further on the downstream side than the upstream-side seal member, and the gas introduction path has a radially extending portion which extends toward the outside in the radial direction from the introduction port, and an axially extending portion which extends from an outer end portion of the radially extending portion to the upstream side along the axis of rotation and reaches the detection end space.

2. The gas turbine according to claim 1, wherein a downstream-side seal member facing the upstream-side rim portion and provided on the downstream side of the annular seal housing, and
the introduction port of the gas introduction path is formed at a position further on the upstream side than the downstream-side seal member.

3. The gas turbine according to claim 1, wherein the upstream-side seal member is one of a brush seal and a leaf-shaped seal.

4. The gas turbine according to claim 1, wherein the gas discharge path extends from the detection end space to the downstream side along the axis of rotation.

5. The gas turbine according to claim 4, wherein a gas path forming hole which extends from the detection end space to the downstream side along the axis of rotation and in which a portion of an internal space forms the axially extending portion of the gas introduction path and the gas discharge path is formed in the annular seal housing, and
a partition member partitioning the internal space into the axially extending portion of the gas introduction path and the gas discharge path, where the partition member is inserted and mounted in the gas path forming hole.

\* \* \* \* \*